E. R. WHEELER.
MOTOR DRIVEN TRACTOR CULTIVATOR.
APPLICATION FILED FEB. 18, 1916.
1,220,383.
Patented Mar. 27, 1917.
2 SHEETS—SHEET 1.
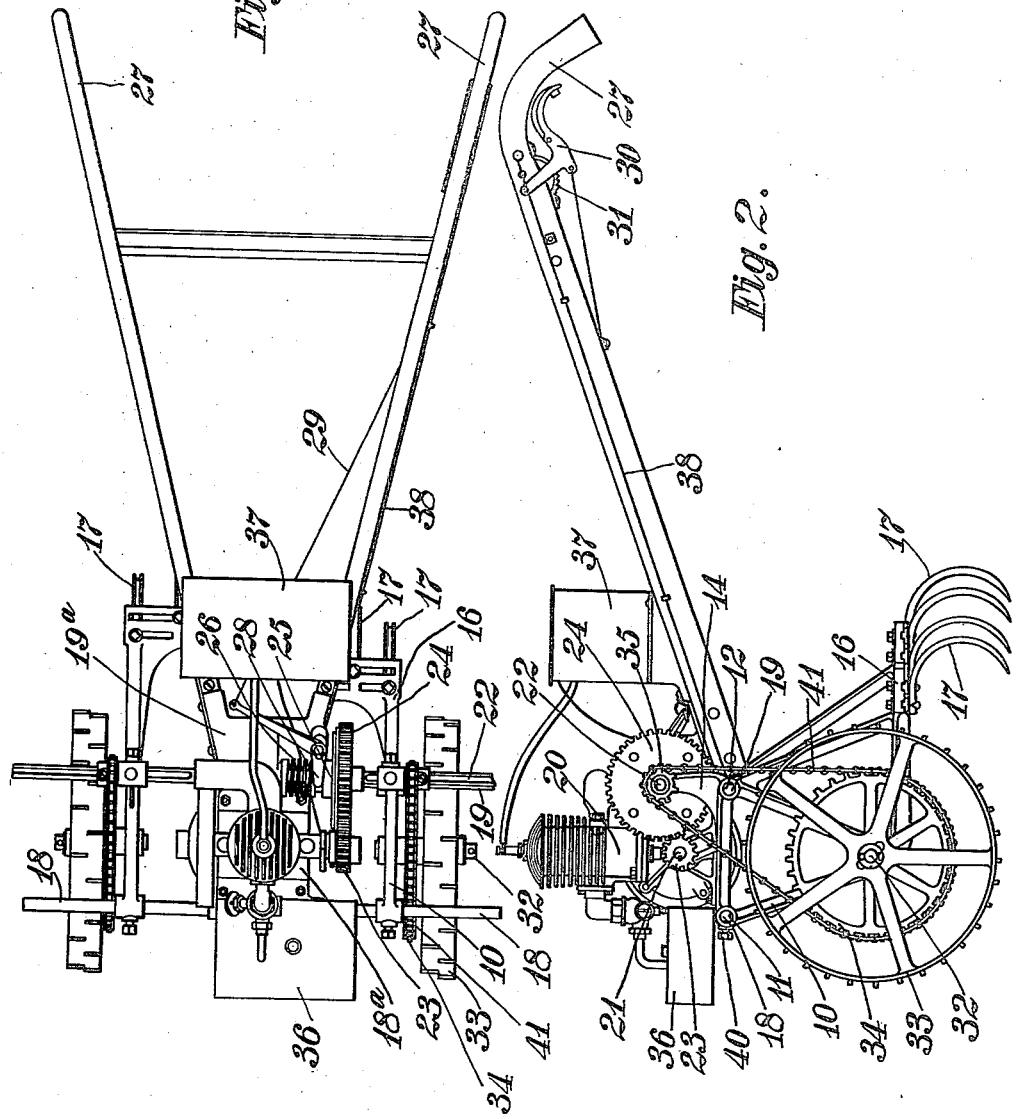
Inventor
Earl R. Wheeler
By Finckel & Finckel
his Attorneys E. R. WHEELER.
MOTOR DRIVEN TRACTOR CULTIVATOR.
APPLICATION FILED FEB. 18, 1916.
1,220,383.
Patented Mar. 27, 1917.
2 SHEETS—SHEET 2.
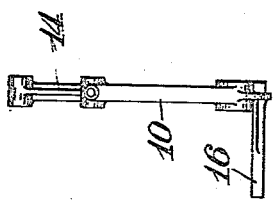
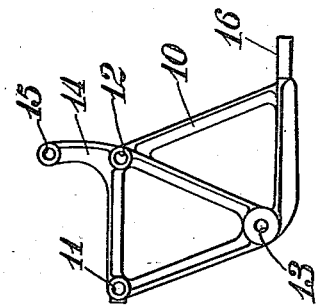
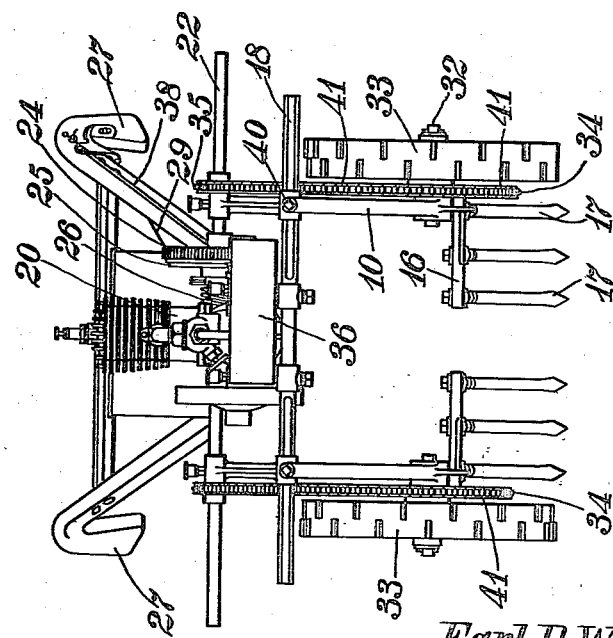
Inventor
Earl R. Wheeler
By
Attorneys

UNITED STATES PATENT OFFICE.

EARL R. WHEELER, OF COLUMBUS, OHIO.

MOTOR-DRIVEN TRACTOR-CULTIVATOR.

1,220,383.  Specification of Letters Patent.  Patented Mar. 27, 1917.

Application filed February 18, 1916. Serial No. 79,171.

*To all whom it may concern:*

Be it known that I, EARL R. WHEELER, a citizen of the United States, residing at Columbus, in the county of Franklin and State of Ohio, have invented a certain new and useful Improvement in Motor-Driven Tractor-Cultivators, of which the following is a specification.

The object of this invention is to provide a motor driven tractor cultivator or similar implement of simple, compact and cheap form so that the work of such an implement can be performed in an economical and efficient manner.

The invention is embodied in the parts and combination of parts hereinafter set forth and particularly pointed out in the claims.

In the accompanying drawings forming part hereof—

Figure 1 is a top plan view of the cultivator.

Fig. 2 is a view in side elevation.

Fig. 3 is a view in front elevation.

Figs. 4 and 5 are side and edge detail views of a side frame used in the construction.

As the side frames which constitute an important feature of this invention are identical and interchangeable, a description of one will suffice for both. Said frame is designated 10 and generally stated is of rhomboidal form and has at three of its angles horizontal openings 11, 12 and 13. This side frame also has extending upwardly and integrally from its rear upper angle an arm 14 provided with a bearing 15, said frame also has a rearwardly extending wing 16 provided with slots to receive the shanks of the cultivator teeth 17, or other tools to be secured thereto.

The openings 11 and 12 of the side frame 10 receive ends of the parallel bars 18 and 19 respectively which, together with suitable connecting pieces 18ª and 19ª, constitute the frame or support for a gasolene engine, the latter being of ordinary construction. The guiding handles 27 of the cultivator are secured to the piece or beam 19ª. The cylinder of the engine is seen at 20. The character 21 designates the crank shaft of the engine.

The opening 15 receives one end of the driven shaft 22, said shaft being geared with the crank shaft by means of a pinion 23 on the latter and a larger gear wheel 24 turning loose on the former. The inner side of the large gear wheel 24 constitutes one member of a clutch, the other clutch member, designated 25, being slidably located on the shaft 22 but splined thereto so as to rotate therewith so that when brought into engagement with the gear-clutch member 24, said shaft 22 will be rotated. The sliding clutch member 25 is normally pressed toward the gear-clutch member 24 by means of a spring 26. The slidable clutch member is actuated against the spring to disconnect that member and stop the operation of the driven shaft by means of a forked lever 28 engaging a groove in the hub of the sliding clutch member, said forked lever being controlled by means of a cord or rod 29 extending rearward to a finger lever 30 pivoted on one of the guiding handles 27 so as to be within constant reach of the fingers of the hand holding that handle. A notched segment 31 with a suitable pawl (not shown) on the finger lever can be employed to latch the clutch member 25 disengaged from the clutch member 24.

The hole 13 of the side frame receives an axle 32 upon which is mounted a tractor wheel 33 operatively connected with the hub of which is a large sprocket wheel 34 around which passes an endless sprocket chain 41 driven by a small sprocket wheel 35 on the drum shaft 22, so that when the driven shaft is driven in the proper direction a forward motion is imparted to the cultivator.

36 designates the gasolene tank; and 37 a box to contain the batteries and coil for sparking the engine.

38 designates a rod or wire for controlling the usual carbureter (not shown).

The side frames 10 are adjustable horizontally on the bars 18 and 19 in any position desired by means of set screws as seen at 40, said screws impinging at their ends against flattened portions of the bars. The frames 10 are held rigid and from flexing by the engagement of the bearing 15 in the rigid arm 14 with the driven shaft 22 and said shaft in turn is supported and braced at its outer end by its bearing in the rigid arm.

Because the frames 10 are identical their positions can be exchanged so that the tractor wheels shall be adjacent each other and the cultivator outermost.

The forms of the parts can be varied to some extent without departing from the gist of the invention as claimed.

What I claim is:

1. In a motor driven tractor cultivator, the combination of an engine, a pair of horizontal laterally extending bars forming a support for the engine, vertical integral side frames slidable onto and adjustable laterally on the ends of said bars so as to permit the straddling of a row of plants, and means for fixing the same thereon, tractor wheels supported on said frames and means whereby the tractor wheels may be driven by the engine.

2. In a motor driven tractor cultivator, the combination of an engine, a pair of horizontal laterally extending bars forming a support for the engine, vertical side frames slidable onto and adjustable on the ends of said bars, and means for fixing the same thereon, tractor wheels supported on said frames, a shaft driven by the engine onto which said side frames are also slidable, and means whereby the tractor wheels may be driven from said driven shaft.

3. In a motor driven tractor cultivator, the combination of an engine, a pair of horizontal laterally extending bars forming a support for the engine, vertical side frames slidable onto and adjustable on the ends of said bars, and means for fixing the same, means on said frame for receiving a garden tool, tractor wheels supported on said frame and means whereby the tractor wheels may be driven by the engine.

EARL R. WHEELER.